United States Patent [19]

Kracke

[11] Patent Number: 5,013,597
[45] Date of Patent: May 7, 1991

[54] MULTI-LAYERED SOUND-INSULATING PANEL FOR MOTOR VEHICLES, OR SIMILAR

[75] Inventor: Wilhelm Kracke, Celle, Fed. Rep. of Germany

[73] Assignee: Sony Corporation, Tokyo, Japan

[21] Appl. No.: 908,947

[22] Filed: Sep. 16, 1986

Related U.S. Application Data

[63] Continuation of Ser. No. 458,555, Jan. 17, 1983, abandoned.

[30] Foreign Application Priority Data

Jan. 22, 1982 [DE] Fed. Rep. of Germany ... 8201511[U]

[51] Int. Cl.$^5$ ............................ B32B 1/00; B32B 3/00
[52] U.S. Cl. .................................. 428/141; 428/156; 428/158; 428/159; 428/166
[58] Field of Search .................. 428/134, 135.14, 156, 428/158, 159, 161, 166, 909, 316.6, 317.1, 317.3, 172, 179, 218

[56] References Cited

U.S. PATENT DOCUMENTS

| | | | |
|---|---|---|---|
| 1,554,179 | 9/1925 | Trader | 181/33.1 |
| 2,153,320 | 4/1939 | Venzie | 181/293 |
| 3,126,978 | 3/1964 | Bergstrom | 428/316.6 |
| 3,649,430 | 3/1972 | Lewis et al. | 428/134 |
| 3,712,846 | 1/1973 | Daniels et al. | 428/141 |
| 3,770,560 | 11/1973 | Elder et al. | 428/134 |
| 4,097,633 | 6/1978 | Focht | 428/161 |
| 4,133,932 | 1/1979 | Peck | 428/161 |
| 4,219,376 | 8/1980 | Roman | 428/156 |
| 4,288,490 | 9/1981 | Alfter et al. | 428/316.6 |

FOREIGN PATENT DOCUMENTS 7733751 9/1978 Fed. Rep. of Germany .
1599020 9/1981 United Kingdom .

*Primary Examiner*—William J. Van Balen
*Attorney, Agent, or Firm*—Lewis H. Eslinger

[57] ABSTRACT

A multi-layered sound-insulating panel for motor vehicles, or similar, consisting of at least one dense layer and one resilient layer between the dense layer and the part of the motor vehicle, or similar, to which the panel is attached, makes it possible—while achieving the acoustic effect required—to realize a design weighing as little as possible, provided the resilient layer has a special shape on account of recesses and/or indentations, and/or knobs, fashioned on purpose.

16 Claims, 2 Drawing Sheets

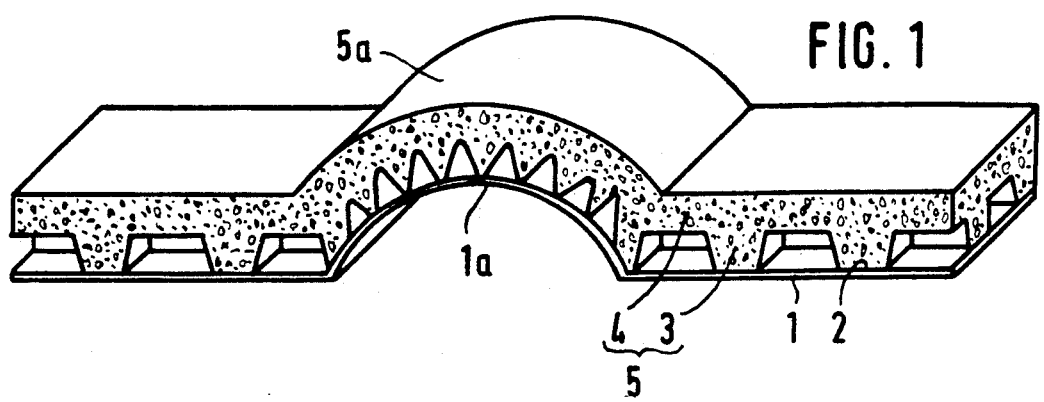
FIG. 1
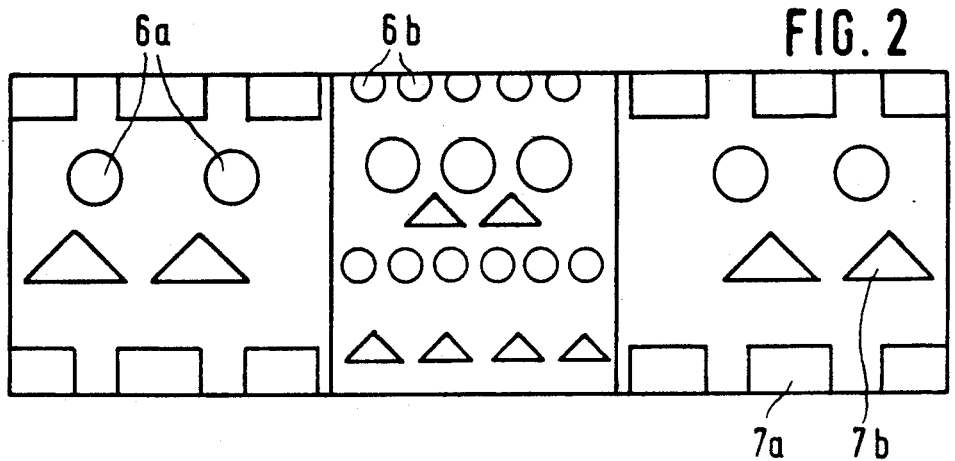
FIG. 2
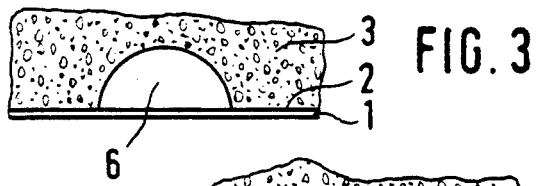
FIG. 3
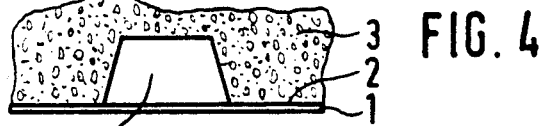
FIG. 4
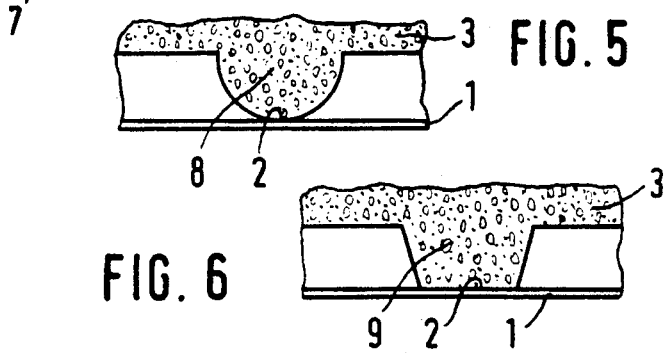
FIG. 5
FIG. 6

MULTI-LAYERED SOUND-INSULATING PANEL FOR MOTOR VEHICLES, OR SIMILAR

The invention concerns a multi-layered sound-absorbing or sound-insulating panel for motor vehicles, or similar, consisting of at least one dense layer and one resilient layer between the dense layer and the part of the motor vehicle to which the panel is attached.

Sound-absorbing or sound-insulating panels are used for sound dampening by inserting them, for example, between noise sources such as engines, and the surrounding area. Sound dampening materials are frequently used in motor vehicles, between the engine compartment and the passenger compartment.

It is known that one can facilitate the removal or the handling of similar sound-insulating panels by making slots or notches in both the dense layer and the resilient layer. A similarly notched sound-insulating panel can be bent by means of a mold and, without further operations, be made to fit the surface which requires protection (DE-GM 77 33 751). Other known sound-insulating panels (DE-GM 78 05 760) are contoured by means of a frame or matrix, so that pockets are formed which resemble truncated cones; these are filled with a filling material such as water or sand. This procedure, too, improves pliability. A regularly contoured sound-insulating panel of this type has pyramid-shaped protrusions (DE-GM 76 37 031).

Along these lines it has become generally known that contouring facilitates any changes in form, without affecting the acoustic effect.

However, it appeared that for motor vehicles sound-insulating panels must have different sound-insulating capacities in different areas. When known sound-insulating panels are used for this application, they have to be sized according to the maximum sound-insulating capacity required. This results not only in oversizing in other places but, above all, in a higher use of materials which means a greater weight of the sound-insulating panels and therefore of the car, which will consequently lead to a higher consumption of energy.

The objective of the invention is to design a sound-insulating panel of the type mentioned at the beginning which, for any acoustic effect required, weighs as little as possible.

According to the invention the objective is achieved through the special form of the resilient layer which is, on purpose, equipped with recesses and/or indentations, and/or knobs.

In particular, the distribution of the recesses and/or indentations, and/or knobs, has been chosen, and they have been designed, in such a way that the acoustic target effect of the entire sound-insulating panel has been achieved.

The invention is further developed by means of the features of the sub-claims.

For similarly designed sound-insulating panels—which are acoustically at least equivalent to traditional sound-insulating panels—it is possible to realize surprising savings in materials for the resilient layer, between 40 and 60%, which means that, overall, the sound-insulating panel will be lighter. In addition, it is possible to fine-tune the acoustic effect.

On account of the fact that sound-insulating panels are generally produced in series, it is certainly worthwhile to spend some seemingly extra money at the beginning, in order to determine the optimum distribution and design of any recesses and/or indentations, and/or knobs. In addition, it will be easier to form the sound-absorbing panels, and one whole sound-absorbing panel may be designed as a formed unit.

The drawing gives examples of forms of execution of the invention. The figures show schematically:

FIG. 1: a sectional view of a sound-insulating panel designed as a formed unit, placed on sheet metal, FIG. 2: a bottom view of the formed unit according to FIG. 1, illustrating the distribution and the design of the recesses, indentations and protrusions, FIGS. 3 to 6: sections of the arrangement according to FIG. 1, showing each time a sectional view of differently designed recesses, indentations and protrusions, and FIG. 7: a different form of execution than the one shown in FIG. 1.

According to FIGS. 1 and 7, a sound-absorbing or sound-insulating panel 5, consisting of a resilient layer 3 and a heavy layer 4, has been attached, by means of an adhesive layer 2, to a part 1 consisting of, for example, sheet metal, of a motor vehicle, or similar. Section 1 shows, for example in its center, a curved or folded section 1a, which is matched by a correspondingly formed section 5a of the sound-insulating panel 5.

The sound-insulating panel 5 has been equipped, over the entire area of the resilient layer 3, which meets part 1, with variously designed recesses or indentations 6, 7, and protrusions 8, 9. Their design and distribution is such that, over the entire sound-insulating panel 5, the acoustic target effect required will be achieved even though, as mentioned at the beginning, the latter does not necessarily evolve in a uniform pattern over the entire sound-insulating panel 5. In addition, the recesses or indentations 6, 7, and the protrusions 8, 9, make it easier to change the form of the sound-insulating panel 5.

FIG. 3 shows a hemispherical indentation 6 in the resilient layer 3 which, as shown in FIG. 2, may have a circular base of various sizes, such as 6a or 6b.

FIG. 4 shows an indentation 7 in the form of a truncated cone, the basis of which may be square, triangular, circular or polygonal, as is represented by 7a and 7b in FIG. 2.

FIGS. 5 and 6 show correspondingly designed protrusions or knobs—8 or 9. Similar knobs 8, 9 make it possible to support, or interrupt, large indented areas.

Figure 7:
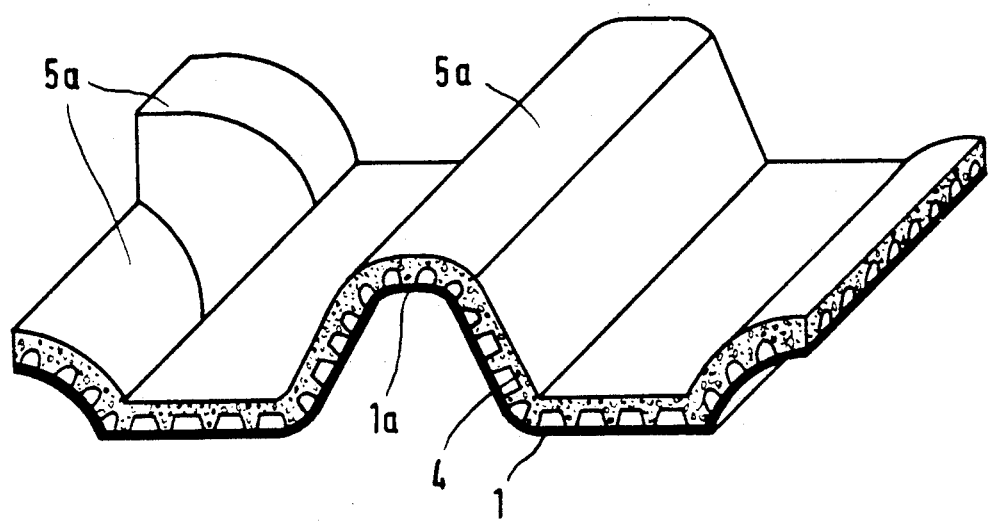

It is also essential that, for the resilient layer 3, considerable savings in materials can be achieved, while maintaining the acoustic effect required. This means that for each area of the sound-insulating panel 5, a distinct and appropriate elasticity characteristic or resilience can be achieved, which permits an optimum acoustic fine-tuning of the sound-insulating panel 5.

Consequently, the design according to the invention not only achieves an optimum adaptation to the acoustic value required, and an exceptionally good adaptation to the contour of part 1, located between the noise source and the area which needs protection against the noise generated, but it leads to considerable savings in materials, which reduces the total weight of the car which, in turn, leads to savings in energy consumption.

Obviously, the invention is not only applicable to noise insulation in cars, but also to other cases of noise insulation.

I claim:

1. A multi-layered sound-insulating panel in combination with a sheet metal surface of a motor vehicle having an engine and drivetrain and passenger compartment for use in reducing sound from the engine and drivetrain from being transmitted to the passenger compartment, which sound has substantial components in the 100-150 Hz frequency range and being present at different levels at different location in the motor vehicle, said panel comprising: a homogeneous foamed elastic material having at least one dense layer and a resilient layer, said resilient layer being adapted to be in contact with a sheet metal surface of the motor vehicle between the passenger compartment and the engine and drivetrain and having a predetermined shape constituted by a plurality of noise-insulating depressions or protrusions arranged in a nonuniform, predetermined distribution on the surface thereof to insulate said different sound levels at said different locations in the motor vehicle.

2. A multi-layered sound-insulating panel according to claim 1; in which said noise-insulating depressions or protrusions include knobs formed on said surface.

3. A multi-layered sound-insulating panel according to claim 1; in which said depressions in said resilient layer comprise hemispherical indentations formed in said surface thereof.

4. A multi-layered sound-insulating panel according to claim 1; in which said protrusions in said resilient layer comprise hemispherical knobs formed on said surface thereof.

5. A multi-layered sound-insulating panel according to claim 1; in which said depressions in said resilient layer are in the form of a portion of a cone.

6. A multi-layered sound-insulating panel according to claim 1; in which said depressions have a triangular base.

7. A multi-layered sound-insulating panel according to claim 5; in which said depressions in the form of a portion of a cone have a circular base.

8. A multi-layered sound-insulating panel according to claim 1; in which said depressions in said resilient layer have a square base.

9. A multi-layered sound-insulating panel according to claim 1; in which said protrusions in said resilient layer include knobs in the form of at least a portion of a cone.

10. A multi-layered sound-insulating panel according to claim 9; in which each of said knobs has a square base.

11. A multi-layered sound-insulating panel according to claim 9; in which each of said knobs has a triangular base.

12. A multi-layered sound-insulating panel according to claim 9; in which each of said knobs has a circular base.

13. A multi-layered sound-insulating panel according to claim 1; in which said panel is formed as an integral unit.

14. A multi-layered sound-insulating panel according to claim 1; wherein said panel includes at least one curved portion and at least one flat portion; and wherein more of said noise-insulating depressions or protrusions on said at least one curved portion than on said at least one flat portion.

15. A multi-layered sound-insulating panel according to claim 1; further comprising adhesive whereby the entire sound-insulating panel is affixed to said sheet metal surface of said motor vehicle.

16. A method of insulating noise in a motor vehicle wherein different levels of noise are produced at different locations on the sheet metal therein comprising the steps of:
   providing a sound-insulating panel comprising a homogeneous foamed elastic material having at least one dense layer and a resilient layer,
   providing said resilient layer with a plurality of noise-insulating depressions and protrusions arranged on the surface thereof,
   distributing said depressions and protrusions on said surface of said resilient layer in a nonuniform, predefined distribution according to said different levels of said noise, and
   disposing said panel in said motor vehicle to insulate said noise by arranging said surface of said resilient layer having said depressions and protrusions in contact with said sheet metal surface.

* * * * *

UNITED STATES PATENT AND TRADEMARK OFFICE
CERTIFICATE OF CORRECTION

PATENT NO.   :   5,013,597
DATED        :   May 7, 1991
INVENTOR(S)  :   Wilhelm Kracke It is certified that error appears in the above-identified patent and that said Letters Patent is hereby corrected as shown below:

On the title page, Item [73] should read --

[73]   Assignee:   Dr. Alois Stankiewicz Schallschluck GmbH & Co.
                   Adelheidsdorf, Germany --

Signed and Sealed this

Seventeenth Day of November, 1992

Attest:

DOUGLAS B. COMER

*Attesting Officer*     Acting Commissioner of Patents and Trademarks